United States Patent
Idris et al.

(10) Patent No.: US 10,890,480 B2
(45) Date of Patent: Jan. 12, 2021

(54) SYSTEMS AND METHODS FOR FINDING AND SOLVING WET GAS VENTURI METER PROBLEMS IN REAL-TIME

(71) Applicant: Saudi Arabian Oil Company, Dhahran (SA)

(72) Inventors: Muhammad Idris, Udhailiyah (SA); Mohammed A. Al-Atwi, Udhailiyah (SA)

(73) Assignee: Saudi Arabian Oil Company, Dhahran (SA)

(*) Notice: Subject to any disclaimer, the term of this patent is extended or adjusted under 35 U.S.C. 154(b) by 299 days.

(21) Appl. No.: 15/890,444

(22) Filed: Feb. 7, 2018

(65) Prior Publication Data

US 2019/0242741 A1    Aug. 8, 2019

(51) Int. Cl.
| | |
|---|---|
| *G01F 1/36* | (2006.01) |
| *G01F 1/74* | (2006.01) |
| *E21B 47/06* | (2012.01) |
| *E21B 47/10* | (2012.01) |

(Continued)

(52) U.S. Cl.
CPC .......... *G01F 25/0053* (2013.01); *E21B 43/12* (2013.01); *E21B 47/06* (2013.01); *E21B 47/07* (2020.05); *E21B 47/10* (2013.01); *E21B 49/08* (2013.01); *G01F 1/36* (2013.01); *G01F 1/44* (2013.01); *G01F 1/74* (2013.01);

(Continued)

(58) Field of Classification Search
CPC .......... G01F 25/00; G01F 25/36; G01F 25/44; G01F 25/74; G01F 25/0053; G01F 25/0007; G01F 1/36; G01F 1/44; G01F 1/74; E21B 43/12; E21B 43/34; E21B 47/06;

(Continued)

(56) References Cited

U.S. PATENT DOCUMENTS

| | | | |
|---|---|---|---|
| 2,337,921 A | 12/1943 | Petroe | |
| 5,099,697 A * | 3/1992 | Agar | G01F 1/74 73/195 |

(Continued)

FOREIGN PATENT DOCUMENTS

WO    2015044133 A1    4/2015

OTHER PUBLICATIONS

International Search Report and Written Opinion for International Application No. PCT/US2019/016977 report dated Apr. 23, 2019; pp. 1-14.

*Primary Examiner* — Gregory J Toatley, Jr.
*Assistant Examiner* — Lynda Dinh
(74) *Attorney, Agent, or Firm* — Bracewell LLP; Constance G. Rhebergen; Vivek P. Shankam (57) ABSTRACT

Systems and methods for finding and solving problems with wet gas venturi meters in one or more gas well sites include one or more gas well sites configured to supply gas to a gas plant, each gas well site comprising a gas well connected to a piping, one or more valves installed on the piping, one or more pressure sensors, one or more temperature sensors, one or more venturi meters configured to measure a differential pressure of the gas in the piping, and one or more programmable logic controllers configured to receive the measured data from the pressure sensors, temperature sensors, and the venturi meters, receive a plurality of dimensions of the one or more venturi meters, receive a plurality of fluid properties values and, determine a first gas rate and first condensate rate for each of the well sites.

20 Claims, 8 Drawing Sheets

(51) Int. Cl.
    *E21B 49/08*     (2006.01)
    *G01F 1/44*     (2006.01)
    *E21B 43/34*     (2006.01)
    *E21B 43/12*     (2006.01)
    *E21B 47/07*     (2012.01)
    *G01F 25/00*     (2006.01)

(52) U.S. Cl.
    CPC .......... *G01F 25/0007* (2013.01); *E21B 43/34* (2013.01); *E21B 49/0875* (2020.05)

(58) Field of Classification Search
    CPC ........ E21B 47/065; E21B 47/10; E21B 49/08; E21B 2049/085; E21B 47/07; E21B 2049/0875
    See application file for complete search history.

(56) References Cited

U.S. PATENT DOCUMENTS

| | | |
|---|---|---|
| 6,463,810 B1 | 10/2002 | Liu |
| 7,231,305 B2 | 6/2007 | Stephenson et al. |
| 8,136,414 B2 * | 3/2012 | Steven ................. G01F 1/88 |
| | | 73/861.63 |
| 8,620,611 B2 * | 12/2013 | Ong ..................... G01F 1/74 |
| | | 702/100 |
| 8,939,033 B2 | 1/2015 | Baker et al. |
| 9,617,833 B2 | 4/2017 | Madasu et al. |
| 2008/0300792 A1 | 12/2008 | Lakhani et al. |
| 2010/0023269 A1 | 1/2010 | Yusti et al. |
| 2011/0114387 A1 * | 5/2011 | Belcher ................. E21B 47/13 |
| | | 175/57 |
| 2011/0132104 A1 * | 6/2011 | Benson ................. G01F 1/40 |
| | | 73/861.63 |
| 2013/0047709 A1 * | 2/2013 | Xie ..................... G01F 1/36 |
| | | 73/61.45 |
| 2014/0039648 A1 * | 2/2014 | Boult ................... G05B 15/02 |
| | | 700/79 |
| 2014/0136125 A1 * | 5/2014 | Agar .................... G01F 7/00 |
| | | 702/45 |
| 2015/0118068 A1 | 4/2015 | Strunk et al. |
| 2016/0341594 A1 | 11/2016 | Singfield |
| 2017/0065932 A1 | 3/2017 | Al-Kuait et al. |
| 2017/0269260 A1 * | 9/2017 | Chen ..................... G01V 13/00 |

* cited by examiner

| Case | Well | Actual Measurement -SCADA/PI READING- | | | | PLC Calculation Result -SCADA/PI READING- | | Calculation Result from Creative Production Monitoring Tool (CPMT) | | Identified Failures & Required Actions of Venturi Meter Measurement | | | | |
|---|---|---|---|---|---|---|---|---|---|---|---|---|---|---|
| | | FWHP | P | dP | T | GAS RATE (MMscfD) | CGR (STB/MMscf) | GAS RATE (MMscfD) | CGR (STB/MMscf) | dP | P | T | Fluid Properties Equation (FPE) | Venturi Throat & Pipe Size |
| #1 | Well-1 | 2,252 | 633 | 18.30 | 96 | 5 | 85 | 15 | 85 | | | | | Wrong Throat/Pipe |
| #2 | Well-2 | 4,611 | 882 | 17.20 | 87 | 8 | 94 | 9 | 31 | | | | Wrong FPE | |
| #3 | Well-3 | 1,345 | 763 | 7.26 | 400 | 5 | 69 | 4 | 91 | | | T calibration | Wrong FPE | |
| #4 | Well-4 | 974 | 0 | 3.92 | 134 | 0 | 0 | 0 | 0 | | P calibration | | | |
| #5 | Well-5 | 1,778 | 821 | -1.43 | 149 | 0 | 0 | 0 | 0 | dP calibration | | | | |
| #6 | Well-6 | 6,048 | 74 | 15.78 | 82 | 3 | 15 | 2 | 75 | | P calibration | | Wrong FPE | |
| #7 | Well-7 | 1,263 | 1,262 | 262.27 | 120 | 30 | 26 | 30 | 26 | dP calibration | | T calibration | | |
| #8 | Well-8 | 2,243 | 1,107 | 6.60 | 423 | 5 | 0 | N/A | N/A | dP calibration | | | Wrong FPE | |

Reference / Failure

FIG. 3

| Case | Well | Actual Measurement -SCADA/PI READING- | | | | PLC Calculation Result -SCADA/PI READING- | | Calculation Result from Creative Production Monitoring Tool (CPMT) | |
|---|---|---|---|---|---|---|---|---|---|
| | | FWHP | P | dP | T | GAS RATE (MMscfD) | CGR (STB/MMscf) | GAS RATE (MMscfD) | CGR (STB/MMscf) |
| #1 | Well-1 | 2,263 | 603 | 20.36 | 81 | 16 | 85 | 16 | 85 |
| #2 | Well-2 | 4,608 | 882 | 17.08 | 86 | 9 | 31 | 9 | 31 |
| #3 | Well-3 | 1,335 | 768 | 7.39 | 199 | 5 | 92 | 5 | 91 |
| #4 | Well-4 | 971 | 702 | 4.03 | 130 | 4 | 91 | 4 | 91 |
| #5 | Well-5 | 1,939 | 782 | 3.42 | 120 | 9 | 92 | 9 | 92 |
| #6 | Well-6 | 5,861 | 1,283 | 23.10 | 110 | 12 | 32 | 12 | 32 |
| #7 | Well-7 | 1,282 | 1,280 | 0.00 | 114 | 0 | 0 | 0 | 0 |
| #8 | Well-8 | 2,287 | 948 | 12.56 | 137 | 8 | 55 | 8 | 55 |

Matched & accepted reading

SYSTEMS AND METHODS FOR FINDING AND SOLVING WET GAS VENTURI METER PROBLEMS IN REAL-TIME

TECHNICAL FIELD

Example embodiments generally relate to automation in gas wells, and more specifically relate to methods and systems for finding and solving wet gas venturi meter problems in gas wells.

BACKGROUND

The determination of the flow rate of fluids flowing within a well is important to the monitoring and control of the movement of the fluids in the well and reservoir. For example, by monitoring the flow rates of both oil and water from each zone of a well, the water production of the entire well may be controlled by reducing the flow from those zones that produce the highest water cut (i.e., ratio of water flow rate to total flow rate), allowing the reservoir oil to be swept more completely during the life of the well.

One common method for determining the velocity of a fluid in a flow stream involves disposing a turbine blade within the flow stream and measuring the rotational velocity of the turbine blade. In single phase flow conditions, the rotational velocity of the turbine blade is simply related to the velocity of the flow stream. Unfortunately however, in multiple phase flow conditions, such as in a mixed oil and water flow condition, the response of the turbine can be so complicated that the results may not be interpretable. Another method for determining the velocity of a fluid in a flow stream involves injecting a tracer substance into the fluid phase of choice (oil or water) and measuring the time it takes for the tracer substance to travel a known distance in the flow stream. The velocity may then be computed using the known distance and the time of travel. One disadvantage of this method for permanent down-hole use is the need for a reservoir of tracer material and a mechanical tracer injector. Because the reservoir and injector are permanently disposed down-hole in the well, the number of velocity measurements is limited by the quantity of tracer material and the injector is prone to sticking and failure.

Another method for determining the velocity of a fluid in a flow stream involves using local capacitance or resistance sensors. However, this method is only appropriate for flow regimes in which one phase is dispersed as droplets in another continuous phase. As a droplet passes one of the sensors, a signal is produced for a time duration related to the speed of the droplet. Given knowledge of the droplet size by other means, the velocity of the droplet, and hence the fluid flow, can be deduced. One disadvantage of this method is that it does not work at all in a stratified flow regime because it relies on the existence of bubbles.

Another method for determining the flow rate of a fluid in a flow stream involves using a Venturi meter to measure the total volumetric flow rate. Venturi meters are flow measurement instruments which use a converging section of pipe to give an increase in the flow velocity and a corresponding pressure drop from which the flow rate can be deduced. They have been in common use for many years, especially in gas wells. Venturi meters are widely used to measure the flow rates of gases, including single-phase gas flow rates of natural gas recovered from gas reservoirs. These meters provide accurate gas flow measurements at the early stages during the life of a gas well, when the well is producing dry gas with a small amount of liquid, such as less than about 5% by volume. However, as reservoirs become mature, the wells start to "cut" or produce more liquid, such as water or other condensate, with the gas. This can occur as the reservoir temperature and pressure decline with production. Liquid present with the gas affects the accuracy of gas flow rate measurement by venturi meters. Additional liquid in the recovered natural gas leads to inaccurate production monitoring, allocation, and reservoir engineering and management decisions.

Nearly all existing gas-producing wells are equipped with venturi meters to measure gas flow rates. However, using multiple venturi meters to correct for the inaccuracies caused by increased liquid cut is expensive and requires significant infrastructure modifications to existing and new pipeline systems. Existing methods to correct for increased liquid cut are expensive and require a number of modifications and additions to existing systems and require frequent calibrations.

SUMMARY

Therefore, there is a need for an improved system for finding and solving problems associated with a wet gas venturi meter in a gas well in real-time.

Accordingly, example embodiments relate to a comprehensive process for calculating the flow rate of gas and condensate in gas wells. Example embodiments present significant enhancement in terms of finding problems of gas venturi measurement and providing a list of appropriate actions to field maintenance crew for fixing the problems. As a result, the reliability and accuracy of the gas venturi meter increases. The use of the new process and system is important in maintaining the reliability and accuracy of gas rate measurement using a venturi meter system.

One example embodiment is a system including one or more gas well sites configured to supply gas to a gas plant, each gas well site including a gas well connected to a piping, one or more valves installed on the piping, one or more pressure sensors configured to measure a pressure of the gas in the piping, one or more temperature sensors configured to measure a temperature of the gas in the piping, one or more venturi meters configured to measure a differential pressure of the gas in the piping, and one or more programmable logic controllers configured to receive the measured data from the pressure sensors, temperature sensors, and the venturi meters, receive a plurality of dimensions of the one or more venturi meters, receive a plurality of fluid properties values, and determine a first gas rate and first condensate rate for each of the well sites, one or more server sites for storing the measured data, the dimensions of the venturi meters, the fluid properties values, the gas rate, and the condensate rate for each of the well sites, and one or more processors, and a non-transitory computer-readable medium in communication with one or more processors and having stored thereon a set of instructions that when executed cause the one or more processors to perform operations including receiving the measured data from the one or more server sites, receiving the plurality of dimensions of the one or more venturi meters from the one or more server sites, receiving the plurality of fluid properties values from the one or more server sites, determining a second gas rate and a second condensate rate for each of the well sites, comparing the second gas rate to the first gas rate and the second condensate rate to the first condensate rate, and identifying one or more problems associated with one or venturi meters in one or more gas well sites.

Another example embodiment is a method for finding and solving problems with one or more wet gas venturi meters in one or more gas well sites. The method includes receiving, by one or more processors, measured data from one or more server sites, receiving a plurality of dimensions of one or more venturi meters on one or more gas well sites from the one or more server sites, receiving a plurality of fluid properties values from the one or more server sites, determining a second gas rate and a second condensate rate for each of the gas well sites, comparing the second gas rate to a first gas rate determined by the well site, and the second condensate rate to a first condensate rate determined by the well site, and identifying one or more problems associated with one or venturi meters in one or more gas well sites.

Another example embodiment is a system including one or more processors, and a non-transitory computer-readable medium in communication with one or more processors and having stored thereon a set of instructions that when executed cause the one or more processors to perform operations including receiving measured data from the one or more server sites, receiving a plurality of dimensions of the one or more venturi meters from the one or more server sites, receiving a plurality of fluid properties values from the one or more server sites, determining a second gas rate and a second condensate rate for each of the well sites, comparing the second gas rate to a first gas rate determined by the well site and the second condensate rate to a first condensate rate determined by the well site, and identifying one or more problems associated with one or venturi meters in one or more gas well sites.

BRIEF DESCRIPTION OF THE DRAWINGS

So that the manner in which the features, advantages and objects of the invention, as well as others which may become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only example embodiments of the invention and is therefore not to be considered limiting of its scope as the invention may admit to other equally effective embodiments.

DETAILED DESCRIPTION

The methods and systems of the present disclosure may now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure may be thorough and complete, and may fully convey its scope to those skilled in the art. Like numbers refer to like elements throughout.

Figure 1:
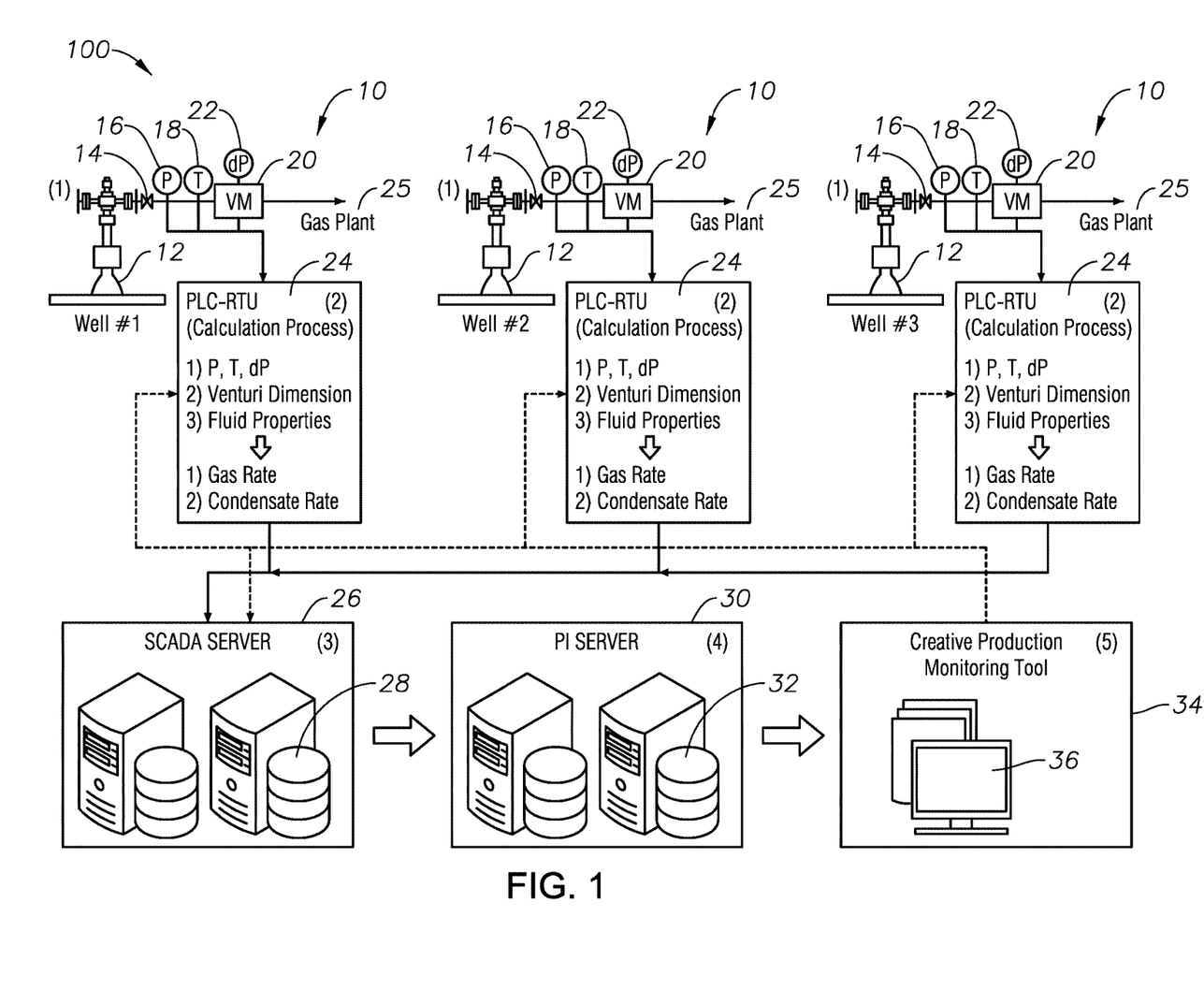
FIG. 1 is a schematic of a smart system for finding and solving problems with a wet gas venturi meter in a gas well, according to one or more example embodiments of the disclosure.

Turning now to the figures, FIG. 1 is a schematic of a smart system 100 for finding and solving problems with a wet gas venturi meter in a gas well, according to one or more example embodiments of the disclosure. As illustrated in this figure, the system 100 may include one or more well sites 10 that may be configured to supply gas to a gas plant 25. Each well site 10 may include a gas well 12, one or more valves 14, one or more pressure sensors 16, one or more temperature sensors 18, one or more venturi meters 20, and one or more differential pressure sensors 22, all of which may be operatively connected to a programmable logic controller (PLC) in a remote terminal unit (RTU) 24. Venturi meters are flow measurement instruments which use a converging section of pipe to give an increase in the flow velocity and a corresponding pressure drop from which the flow rate can be deduced. They have been in common use for many years, especially in gas wells. There are three main actual measurement readings on gas well 10 that may be used to calculate the gas-condensate flow rate. Those readings are the flow line or Venturi pressure (P), the flow line or Venturi temperature (T), and the differential pressure of Venturi Meter (dP), each of which may be measured using the one or more pressure sensors 16, one or more temperature sensors 18, and one or more venturi meters 20, respectively. These three flow parameters may be transmitted into the Programmable Logic Controller (PLC) inside the Remote Terminal Unit (RTU) 24 at field or well site in real-time.

In some embodiments, the flow rate calculation can be processed inside the PLC-RTU 24 for each individual gas well site 10. The dimensions of Venturi Meter can be defined by the internal diameter of Venturi pipe (DP) and the throat (DT). The required fluid properties values such as gas density ($\rho g$), condensate density ($\rho c$), condensate mass fraction (CMF), gas conversion factor (GCF), and condensate conversion factor (CCF) are calculated using the correlation as a function of pressure and temperature. This correlation has been generated from PVT analysis for specific reservoir at certain condensate gas ratio (CGR). The general equations or formula that can be applied in the calculation process are provided in later parts of this section. Finally, the result of the calculation process are the gas rate (Qg) and condensate rate (Qc).

The result of the gas-condensate rate from the calculation process along with the main actual measurement readings are delivered to a Supervisory Control and Data Acquisition (SCADA) server 26 in real-time. The SCADA server may include one or more servers 28 including one or more databases and one or more database management systems (not shown). This information can be used by a field operator to monitor gas production and to do a gas rate adjustment for all gas wells remotely. The same readings in SCADA server may be transmitted into a Plant Information (PI) server 30. The PI server may include one or more servers 32 including one or more databases and one or more database management systems (not shown). The data may be utilized for further production data analysis such as well production monitoring and evaluation by production or reservoir engineers.

The smart system 100 may further include a creative production monitoring tool 34 for finding and solving problems with a wet gas venturi meter in a gas well, according to one or more example embodiments of the disclosure. The creative production monitoring tool (CPMT) 34, which may include one or more processors 36, may be operatively connected to the PI server 30 to receive data from that server and perform operations explained in further detail with respect to FIGS. 2 and 7.

Figure 2A:
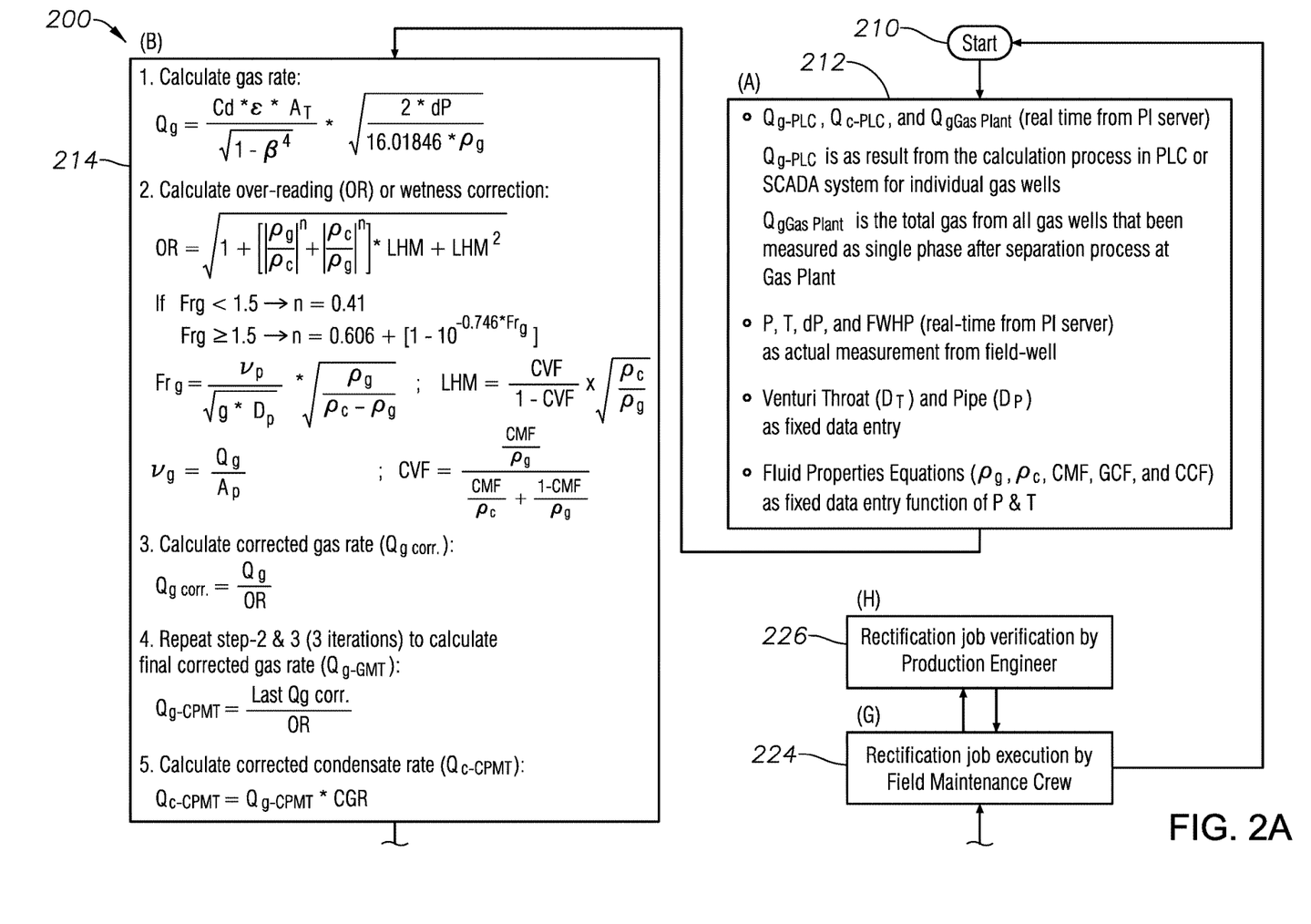
FIGS. 2A-2B illustrate example steps in a method for finding and solving problems with a wet gas venturi meter in a gas well, according to one or more example embodiments of the disclosure.
Figure 2B:
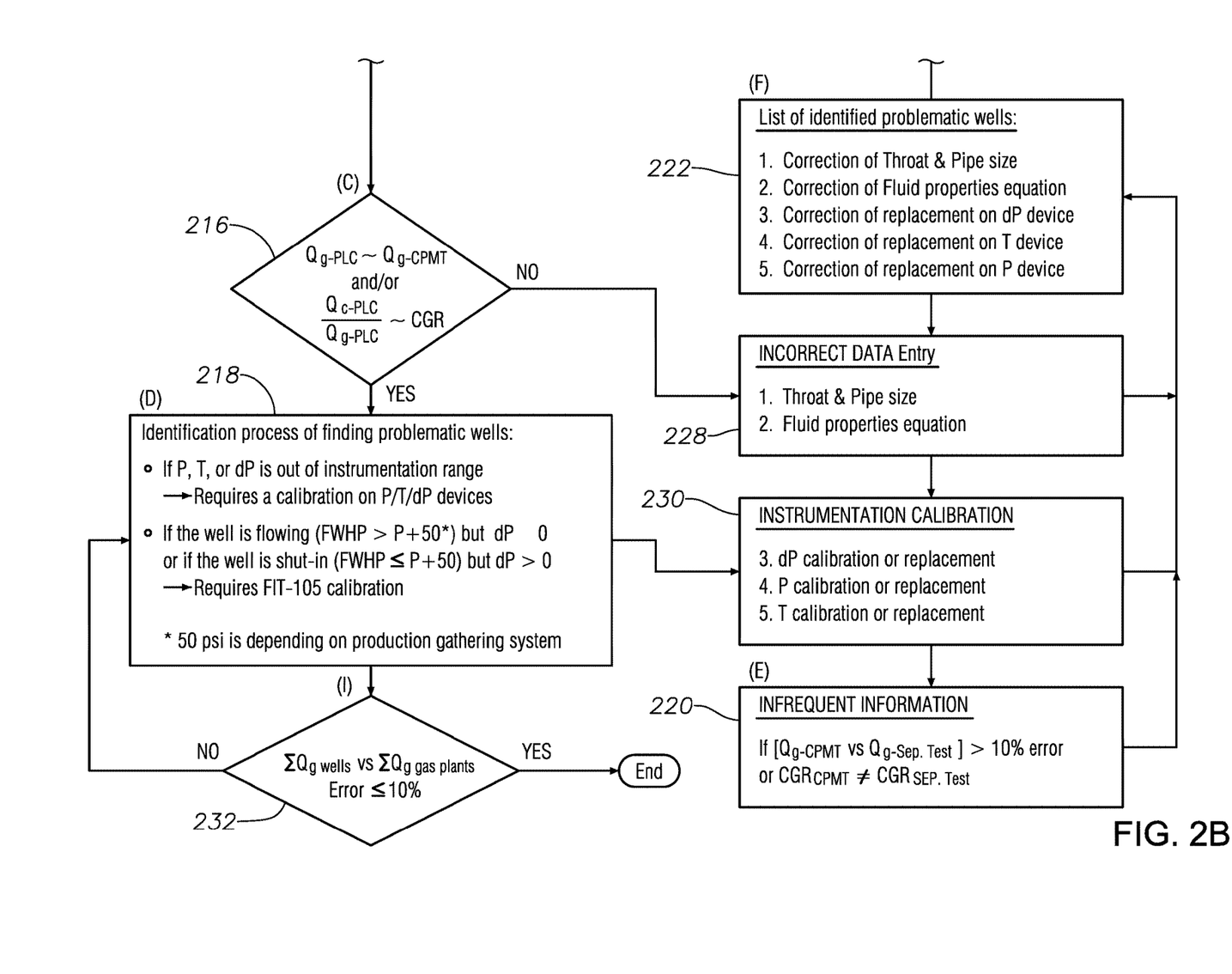

FIGS. 2A-2B illustrate example steps in a method 200 for finding and solving problems with a wet gas venturi meter in a gas well, according to one or more example embodiments of the disclosure. At step 210, the creative production monitoring tool 34 receives the data from the PI server. At step 212, the data input parameters for every individual gas well consists of two (2) categories which may include real-time reading, for example, readings that may be retrieved through PI server from SCADA server in real-time. These parameters may include P, T, dP, and FWHP as the actual measurement from the individual gas wells. The first three variables may be directly used for calculating the gas flow rate in CPMT process system. The FWHP reading is to determine the flow condition of the well which is shut-in or flowing. $Q_{g-PLC}$ and $Q_{c-PLC}$ are the results from PLC-RTU's calculation process from the individual gas well that may be used for rate verification. $Q_{gGas\ Plant}$ is as the actual total gas production after separation process of gas and liquid from all gas wells at gas plant. The value may be used to evaluate the accuracy between the overall total gas rate of Venturi Meters (well stream) and Total gas rate measured at gas plant. Fixed data entry may include, for example, the dimension of Venturi Meter such as the information of the internal diameter throat and pipe from all gas wells. The parameters may further include fluid properties correlation, such as the correlation which may be a function of pressure and temperature that may be used to determine the density of gas and condensate phase and also to know the condensate mass fraction from the total mass. The correlation also is used to convert the flow rate into standard condition.

After the data is received in step 212, the process in step 214 applies the same equations or formula that has been used in PLC-RTU system. The detail equations are provided in later parts of this section. At step 216, the system performs a rate verification process, which is to verify the result of PLC-RTU i.e. $Q_{g-PLC}$ and $CGR_{PLC}$ for every individual gas well. If one or both values are not matching with the result of CPMT process, then the system may be put the data under category "wrong/incorrect data entry" either because of incorrect throat-pipe size or fluid properties correlation, which are later addressed in step 228 of the process. At step 218, the system performs a problem identification logic, where unrealistic readings of P-T-dP measurement such as negative number, too-low or too-high value which out of the instrumentation-range may be categorized under "requires a device calibration or replacement," which are later addressed at step 230 of the process. It should noted here, however, that for a specific case, the over-size of throat diameter could impact the accuracy of Venturi measurement.

At step 220, the system checks for infrequent information. For example, in case of any well had a deliverability test using 3-Phase Separator Test and the result of gas-condensate rate shows a significant discrepancy with Venturi Meter reading, then the well may be added into a problematic wells list in step 222. The type of required rectification job is to change the fluid properties correlation with lower or higher CGR value and/or to do a calibration on the P-T-dP gauges-transmitter. At step 222, the system generates a list of identified problematic wells. The well(s) that been identified having a problem from Step 216-220 may be sent to maintenance crew for rectification work. At step 224, the rectification job execution may be performed. For example, after receiving the list of problematic wells, the maintenance crew may do the necessary rectification job for each well as per requirement in Step 222. The completed job may be reported to production engineer for further verification. At step 226, a rectification job verification may be performed. For example, the problematic wells that have been fixed by maintenance crew may be verified by production engineer. The maintenance crew might need to rework the rectification job if the initial completed job is not accepted by production engineer. Lastly, at step 232, a rate accuracy evaluation may be performed by the system. This final step is to review the overall performance of Venturi Meters from all gas wells. This review may compare the total gas production between Venturi Meters and slug-catcher at Gas Plant. If the rate-discrepancy (error) is more than 10%, then the process may go back to Step 218 until the error is less than 10%.

Figure 3:
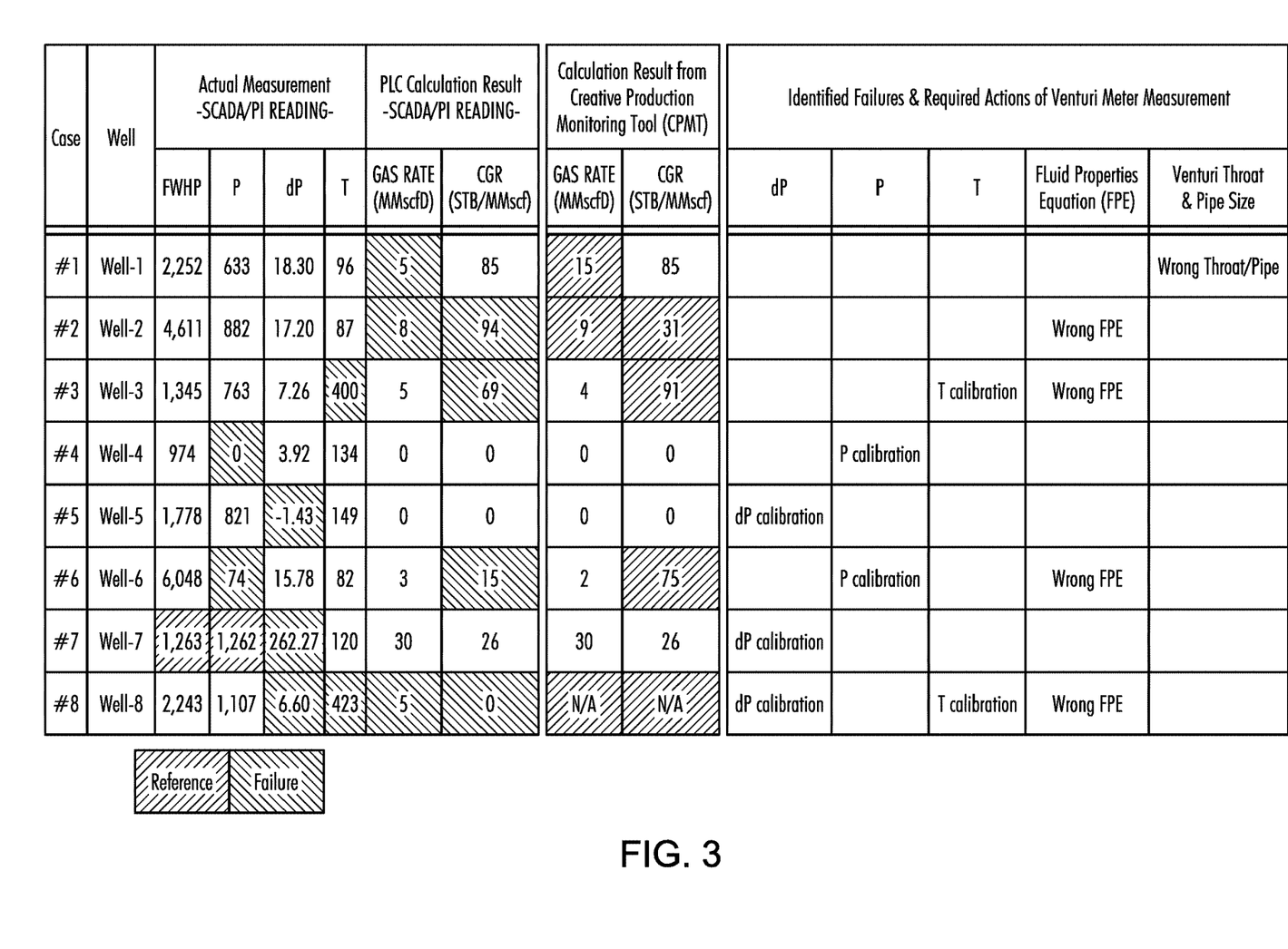
FIG. 3 is an example list of problematic wells identified by a smart system, according to one or more example embodiments of the disclosure.
Figure 4:
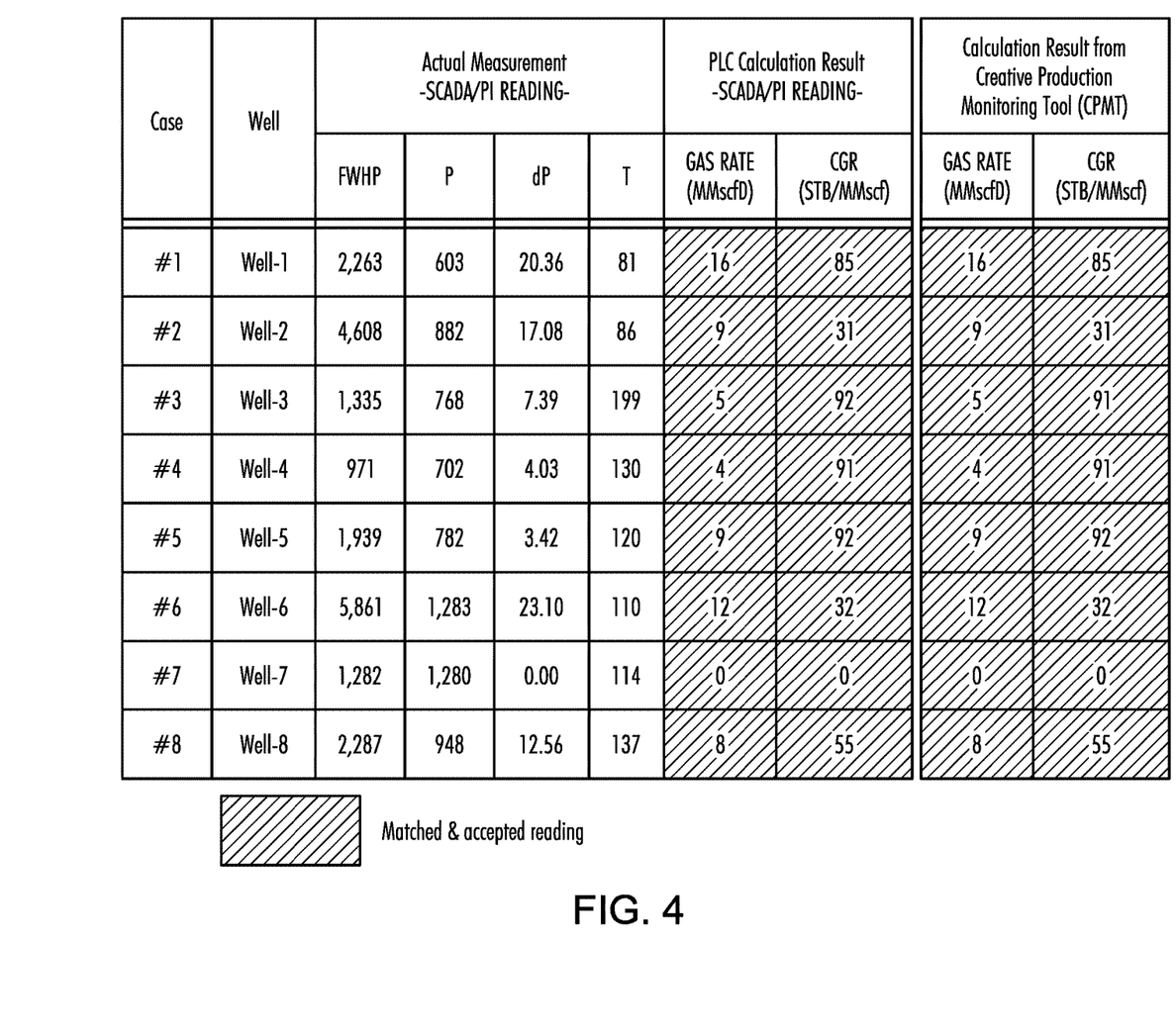
FIG. 4 is a result of the venturi meter rectification job performed on the data illustrated in FIG. 3 by a smart system, according to one or more example embodiments of the disclosure.

FIG. 3 is an example list of problematic wells identified by a smart system, according to one or more example embodiments of the disclosure, and FIG. 4 is a result of the venturi meter rectification job performed on the data illustrated in FIG. 3 by a smart system, according to one or more example embodiments of the disclosure. As it can be seen from these figures, the venturi meter of the present smart system 100 demonstrated as being reliable and accurate metering that can provide an adequate gas flow rate reading for gas/condensate fields in a cost-effective way.

Figure 5:
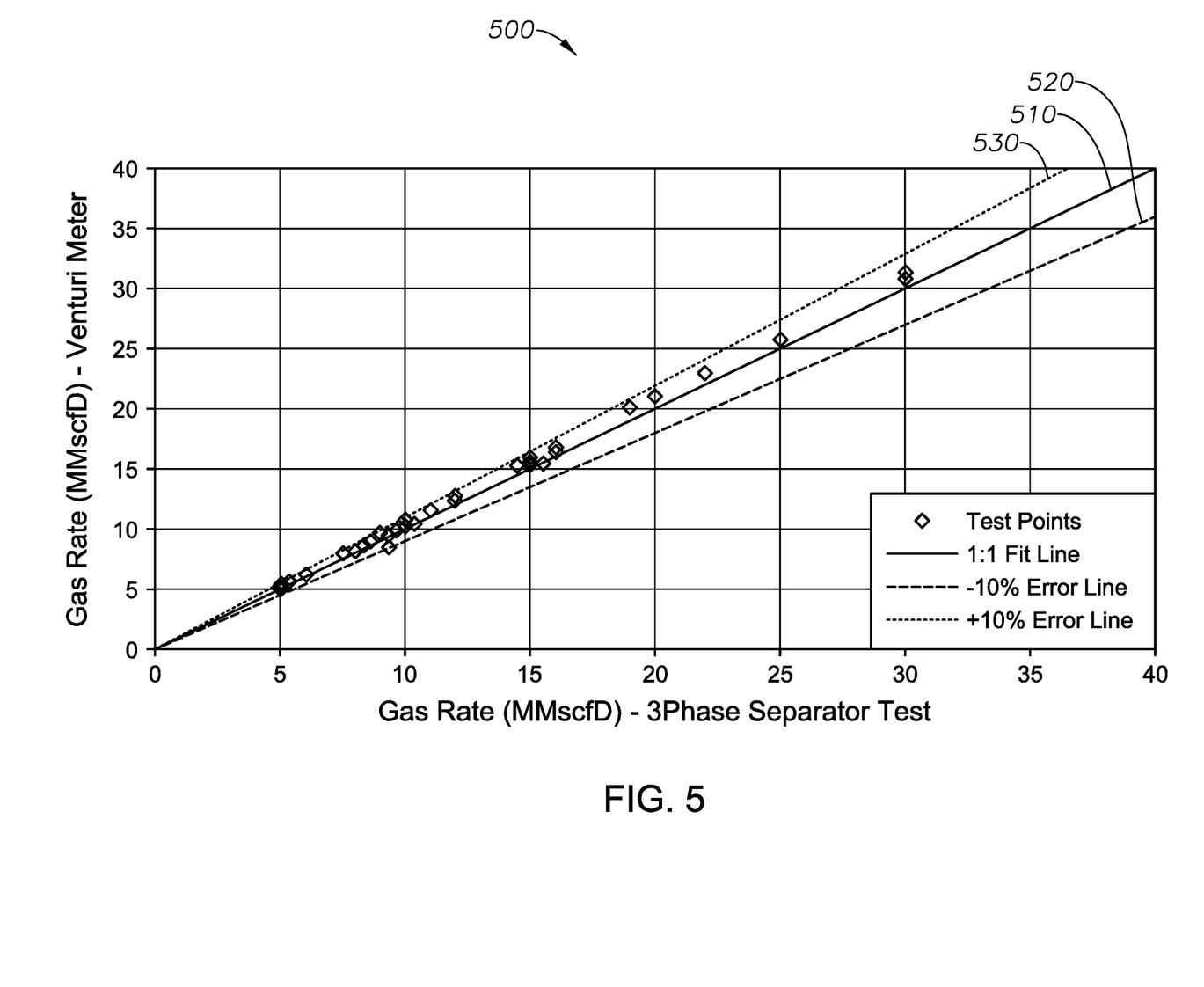
FIG. 5 is an example graph showing values for actual gas rate determined using a 3-phase separator test versus values determined using the venturi meter of a smart system, according to one or more example embodiments of the disclosure.

FIG. 5 is an example graph 500 showing values for actual gas rate determined using a 3-phase separator test versus values determined using the venturi meter of a smart system, according to one or more example embodiments of the disclosure. In graph 500, line 510 is the 1:1 fit line, line 520 is the −10% error line, and line 530 is the +10% error line. As it can be seen in this figure, the gas rate determined by the venturi meter of the present smart system is almost along the 1:1 fit line 510, which shows to prove that the Venturi Meter provided an accurate gas rate measurement with the error less than 10%. The range of data used for the comparison are:

CGR 12-420 stb/MMscf

WGR 1-9 stb/MMscf

In case the gas-well produces a significant water production from the formation-reservoir e.g. WGR>10 stb/MMscf, it could impact the accuracy of gas flow rate of Venturi Meter. The process of calculating the gas flow rate using Venturi Meter measurement system comprises three (3) key groups, including for example, fluid properties ($\rho_g$, $\rho_c$, CMF, GCF, and CCF) which may be determined from the correlations as a function of pressure and temperature. It was generated from PVT test analysis for multiple fields and reservoirs at certain CGR value in various gas fields. Those fluid properties correlations are called as a PVT Table, for example. The key groups may further include fundamental of flow equation, which may be using the primary equations provided in the ISO 5167-4:2003. The key group may include wet gas correction, which uses the Rick de Leeuw correlation available in the "North Sea Flow Meter (NSFM) workshop paper 21-1997" selected for wet gas correction or over-reading factor. This correction factor may reduce the error of Venturi Meter measurement because of the presence of liquid in some cases.

Example Flow Calculation Equations:

$$Q_g = \frac{Cd * \varepsilon * A_T}{\sqrt{1-\beta^4}} * \sqrt{\frac{2*dP}{16.01846*\rho_g}}$$

$$Q_{g\,corr.} = \frac{Q_g}{OR}$$

$$OR_{de\,Leeuw} = \sqrt{1 + \left[\left|\frac{\rho_g}{\rho_c}\right|^n + \left|\frac{\rho_c}{\rho_g}\right|^n\right] * LHM + LHM^2}$$

If $Fr_g < 1.5 \rightarrow n = 0.41$ $Fr_g \geq 1.5 \rightarrow n = 0.606 * [1 - 10^{-0.746*Fr_g}]$ $$Fr_g = \frac{\vartheta_g}{\sqrt{g*D_P}} * \sqrt{\frac{\rho_g}{\rho_c - \rho_g}}$$

$$LHM = \frac{CVF}{1-CVF} \times \sqrt{\frac{\rho_c}{\rho_g}}$$

$$CVF = \frac{\frac{CMF}{\rho_c}}{\frac{CMF}{\rho_c} + \frac{1-CMF}{\rho_g}}$$

The unified PVT Table or fluid properties correlations are:

1. $\rho_g = a_1 + (b_1 * T) + (c_1 * P) + (d_1 * T^2) + (e_1 * P^2) + (f_1 * T * P) + (g_1 * T^3) + (h_1 * P^3) + (i_1 * T * P^2) + (j_1 * T^2 * P)$ 2. $\rho_c = a_2 (b_2 * T) + (c_2 * P) + (d_2 * T^2) + (e_2 * P^2) + (f_2 * T * P) + (g_2 * T^3) + (h_2 * P^3) + (i_2 * T * P^2) + (j_2 * T^2 * P)$ 3. $CMF = a_3 + (b_3 * T) + (c_3 * P) + (d_3 * T^2) + (e_3 * P^2) + (f_3 * T * P) + (g_3 * T^3) + (h_3 * P^3) + (i_3 * T * P^2) + (j_3 * T^2 * P)$ 4. $GCF = \dfrac{24}{TotalMass * (1-CMF) * CGR}$ 5. $CCF = \dfrac{24}{TotalMass * CMF}$ The constants of a, b, c, d, e, f, g, h, i, j, k are specific for each fields and reservoirs at different CGR values for each gas well. There are multiple sets of PVT Tables that been applied for determination of fluid properties in the gas flow calculation process.

Wherein:

ε: Expansion factor, dimensionless $$\varepsilon = \sqrt{\frac{k*\tau^{\frac{2}{k}}}{k-1} * \frac{1-\beta^4}{1-\left(\beta^4 * \tau^{\frac{2}{k}}\right)} * \frac{1-\tau^{\frac{k-1}{k}}}{1-\tau}}$$

β: Ratio of DT/DP, dimensionless
$\rho_c$: Condensate density, lb/ft$^3$
$\rho_g$: Gas density, lb/ft$^3$
$\upsilon_g$: Gas velocity;

$$\frac{Qg}{A_P},$$

m/sec
$A_P$: Area of pipe, $0.25*\pi*D_P^2$, m$^2$
$A_T$: Area of throat, $0.25*\pi*D_T^2$, m$^2$
$C_d$: Discharge coefficient i.e. 0.995, dimensionless
dP: Differential pressure of Venturi, kPa
$D_P$: Internal diameter of Venturi pipe, m
$D_T$: Internal diameter of Venturi throat, m
k: isentropic coefficient i.e. 1.2, dimensionless
τ: Ratio of pressure, $$\frac{P}{P+(dP*6.89476)},$$

dimensionless
CCF: Condensate Convention Factor, stbpd/(lb/hr)
CGR: Condensate Gas Ratio=$Q_c/Q_g$, stb/MMscf
CMF: Condensate Mass Fraction, dimensionless
CVF: Condensate Volume Fraction
$Fr_g$: Froude Number, dimensionless $$Fr_g = \frac{\vartheta_g}{\sqrt{g*D_P}} * \sqrt{\frac{\rho_g}{\rho_c - \rho_g}}$$

FWHP: Upstream or Flowing Wellhead: psi Pressure
GCF: Gas Convention Factor, MMscfD/(lb/hr)
g: Gravitational acceleration i.e. 9.81, (m/sec$^2$)
OR: Over Reading or Wet Gas, dimensionless Correction (WGC)
P: Flowline of Venturi pressure, psi
$Q_g$: Gas Rate, m$^3$/sec
$Q_c$: Condensate Rate, m$^3$/sec
$Q_{g\,corr.}$: Corrected gas flowrate, MMscfD
$Q_{c\,corr}$: Corrected condensate flowrate, Stbpd
$Q_{g\text{-}PLC}$: Corrected gas flowrate resulted from, MMscfD calculation process in PLC-RTU system
$Q_{c\text{-}PLC}$: Corrected condensate flowrate, Stbpd resulted from calculation process in PLC-RTU system
$Q_{gGas\,Plant}$: Actual total gas rate measured from, MMscfD all gas wells after separation process from liquid production at Gas Plant
T: Flowline or Venturi temperature, deg F Conversion:

dP (kPa)=dP (in-water)*6.89476/27.6799=dP (in-water)*0.249089 dP (psi)=dP (kPa)/6.89476

P (kPa)=P (psi)*6.89476

$\rho_g$ (kg/m$^3$)=$\rho_g$(lb/ft$^3$)*0.45359237/0.3048$^3$ $$Q_g \text{ (ft}^3\text{/sec)} = Q_g \text{ (m}^3\text{/sec)}/0.3048^3$$

$$Q_g \text{ (lb/hr)} = Q_g \text{ (ft}^3\text{/sec)} * 3600 * \rho_g \text{ (lb/ft}^3\text{)}$$

$$Q_g = Qg \text{ (lb/hr)} * \text{GCF (MMscfD/(lb/hr)) (MMscfD)}$$

$$\rho_c \text{(kg/m}^3\text{)} = \rho_c \text{ (lb/ft}^3\text{)} * 0.45359237/0.3048^3$$

$$Q_{c\ corr.} = Q_{g\ corr.} \text{ (ft}^3/sec) * \frac{CVF}{1-CVF}$$

$$(\text{ft}^3/sec)$$

$$Q_{c\ corr.}(\text{ft}^3/\text{sec}) * 3600 * \rho_c \text{ (lb/ft}^3\text{) (lb/hr)}$$

$$Q_{c\ corr.} \text{ (lb/hr)} * \text{CCF (stbpd/(lb/hr)) (stbpd)}$$

$$\text{or} = Q_{g\ corr.} * \text{CGR}$$

Figure 6:
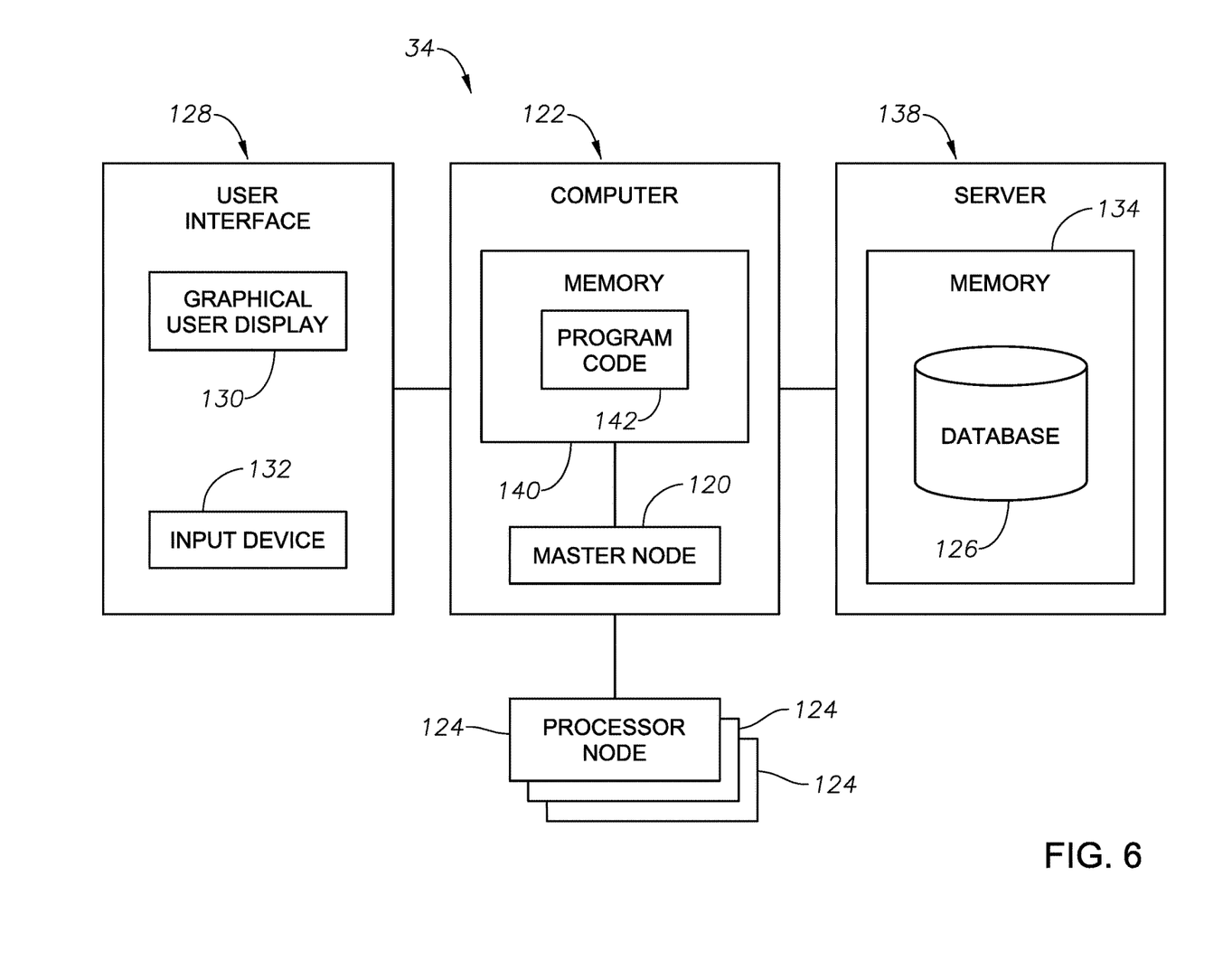
FIG. 6 is a schematic block diagram of a data processing system for finding and solving problems with a wet gas venturi meter in a gas well, according to one or more example embodiments of the disclosure.

Turning now to FIG. 6, shown schematically in FIG. 6 in a data processing system such as the CPMT 34, which may include a master node 120 of a CPU 122 and a group of processor or worker nodes 124 operating as a network exploration and production data. As may be set forth, the data processing system 34 processes gas production data with a controllable specified quality of service (QoS) for the processing applications. Data processing system 34 operates according to the processing techniques which are shown schematically in FIGS. 2 and 7. Thus, processing of gas production data are performed without impacting or losing processing time in case of failures.

Considering now the data processing system according to the present invention, as illustrated in FIG. 6, the data processing system 34 is provided as a processing platform for processing data. The data processing system 34 includes one or more central processing units or CPUs 122. The CPU or CPUs 122 have associated therewith a memory or database 126 for general input parameters, of a type and nature according to the gas production data being processed.

A user interface 128 operably connected with the CPU 122 includes a graphical display 130 for displaying graphical images, a printer or other suitable image forming mechanism and a user input device 132 to provide a user access to manipulate, access, and provide output forms of processing results, database records, and other information. The memory or database 126 is typically in a memory 134 of an external data storage server or computer 138. The database 126 contains data including the structure, location, and organization of the cells in the reservoir model, data general input parameters, as well as the exploration and production data to be processed, as may be described below.

The CPU or computer 122 of data processing system 34 includes the master node 120 and an internal memory 140 coupled to the master node 120 to store operating instructions, control information, and to serve as storage or transfer buffers as required. The data processing system 34 includes program code 142 stored in memory 140. The program code 142, according to the present invention, is in the form of computer operable instructions causing the master node 120 and processor nodes 124 to transfer the gas production data and control instructions back and forth according to DDS intercommunication techniques, as may be set forth.

It should be noted that program code 142 may be in the form of microcode, programs, routines, or symbolic computer operable languages that provide a specific set of ordered operations that control the functioning of the data processing system 34 and direct its operation. The instructions of program code 142 may be stored in memory 140 or on computer diskette, magnetic tape, conventional hard disk drive, electronic read-only memory, optical storage device, or other appropriate data storage device having a computer usable medium stored thereon. Program code 142 may also be contained on a data storage device as a computer readable medium.

The processor nodes 124 are general purpose, programmable data processing units programmed to perform the processing of exploration and production data according to the present invention. The processor nodes 124 operate under control of the master node 120 and the processing results obtained are then assembled in memory 134 where the data are provided for formation with user interface 128 of output displays to form data records for analysis and interpretation.

Although the present invention is independent of the specific computer hardware used, an example embodiment of the present invention is preferably based on a master node 120 and processor nodes 124 of an HP Linux cluster computer. It should be understood, however, that other computer hardware may also be used.

Figure 7:
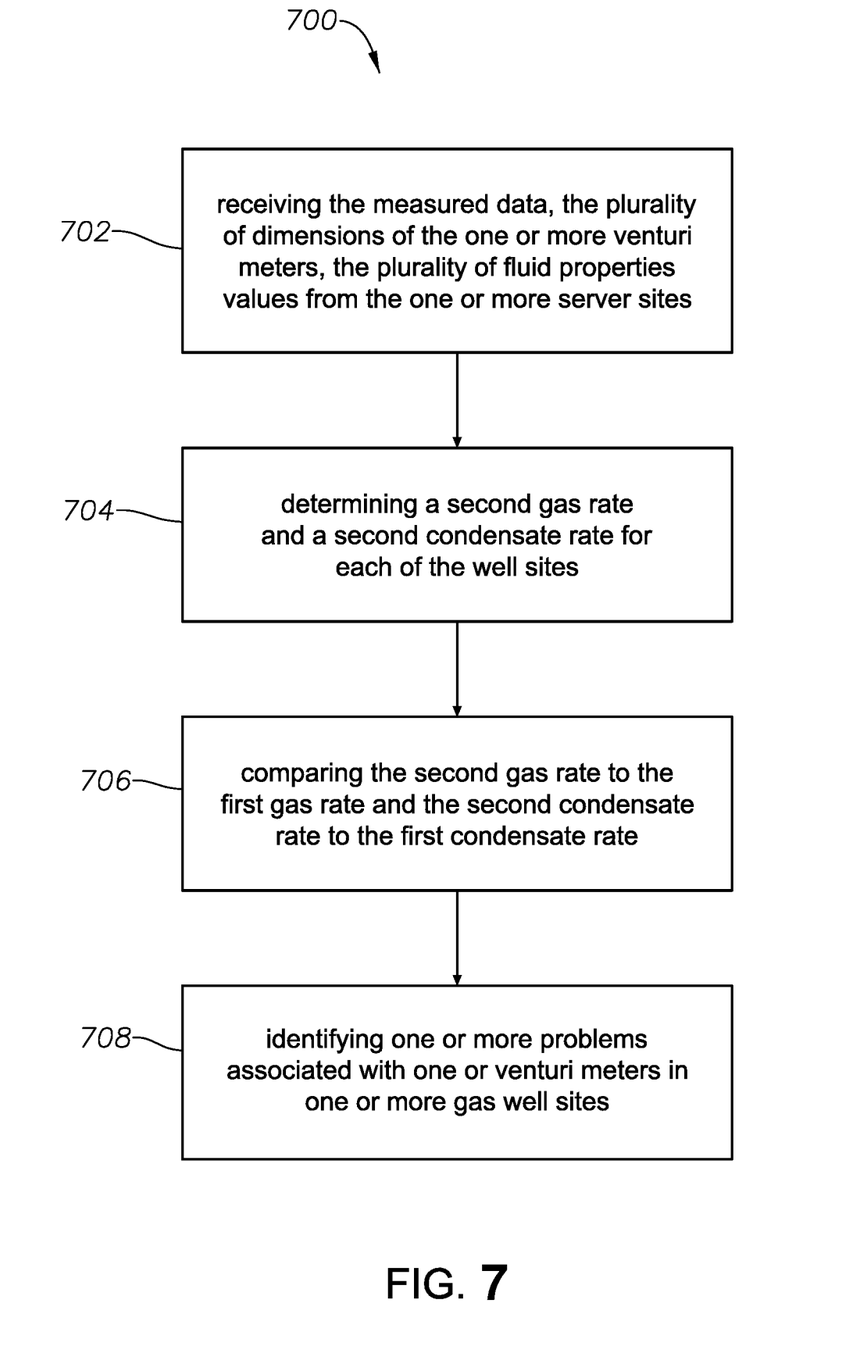
FIG. 7 illustrates example steps in a method for finding and solving problems with a wet gas venturi meter in a gas well, according to one or more example embodiments of the disclosure.

FIG. 7 illustrates example steps in a method 700 for finding and solving problems with a wet gas venturi meter in a gas well, according to one or more example embodiments of the disclosure. One example embodiment is system 34 for finding and solving problems with a wet gas venturi meter in a gas well, according to one or more example embodiments of the disclosure. The system 34 includes one or more processors 122, 124, and a non-transitory computer-readable medium 140 in communication with one or more processors 122, 124 and having stored thereon a set of instructions 142 that when executed cause the one or more processors 122, 124 to perform operations including the steps illustrated in FIGS. 2 and 7, for example. In some embodiments, the system may include one or more gas well sites configured to supply gas to a gas plant, each gas well site comprising a gas well connected to a piping, one or more valves installed on the piping, one or more pressure sensors configured to measure a pressure of the gas in the piping, one or more temperature sensors configured to measure a temperature of the gas in the piping, one or more venturi meters configured to measure a differential pressure of the gas in the piping, and one or more programmable logic controllers configured to receive the measured data from the pressure sensors, temperature sensors, and the venturi meters, receive a plurality of dimensions of the one or more venturi meters, receive a plurality of fluid properties values, and determine a first gas rate and first condensate rate for each of the well sites. The system may also include one or more server sites for storing the measured data, the dimensions of the venturi meters, the fluid properties values, the gas rate, and the condensate rate for each of the well sites.

The system may further include one or more processors, and a non-transitory computer-readable medium in communication with one or more processors and having stored thereon a set of instructions that when executed cause the one or more processors to perform operations 702-708 including receiving the measured data from the one or more server sites, receiving the plurality of dimensions of the one or more venturi meters from the one or more server sites, receiving the plurality of fluid properties values from the one or more server sites at step 702, determining a second gas rate and a second condensate rate for each of the well sites at step 704, comparing the second gas rate to the first gas rate and the second condensate rate to the first condensate rate at step 706, and identifying one or more problems associated with one or venturi meters in one or more gas well sites at step 708.

The method may further include receiving an actual total gas production after separation process of gas and liquid from all gas wells at the gas plant, and evaluating the accuracy between the overall total gas rate of venturi meters and total gas rate measured at the gas plant. The method may also include categorizing the data as incorrect or wrong if one or both of the values are not matching because of incorrect throat or pipe size or fluid properties correlation. The method may further include determining the measured data from the one or more server sites is outside of a predetermined threshold range, and generating a device calibration or device replacement requirement. The method may also include categorizing a well as a problematic well if the determined gas rate or determined condensate rate is outside of a predetermined threshold range of a 3-Phase Separator Test values, and generating a rectification job to change the fluid properties correlation with lower or higher CGR value and/or to do a calibration on the P-T-dP gauges-transmitters. The method may also include generating a list of identified problematic wells, and transmitting the list to maintenance crew for performing rectification work. The method may further include evaluating a rate accuracy by reviewing the overall performance of venturi meters from all the gas wells and comparing the total gas production between venturi meters and slug-catcher at the gas plant, and generate an alert if the rate-discrepancy or error is more than a predetermined percentage.

The Specification, which includes the Summary, Brief Description of the Drawings and the Detailed Description, and the appended Claims refer to particular features (including process or method steps) of the disclosure. Those of skill in the art understand that the invention includes all possible combinations and uses of particular features described in the Specification. Those of skill in the art understand that the disclosure is not limited to or by the description of embodiments given in the Specification.

Those of skill in the art also understand that the terminology used for describing particular embodiments does not limit the scope or breadth of the disclosure. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this invention belongs unless defined otherwise.

As used in the Specification and appended Claims, the singular forms "a," "an," and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced. "Optionally" and its various forms means that the subsequently described event or circumstance may or may not occur. The description includes instances where the event or circumstance occurs and instances where it does not occur.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

The systems and methods described herein, therefore, are well adapted to carry out the objects and attain the ends and advantages mentioned, as well as others inherent therein. While example embodiments of the system and method has been given for purposes of disclosure, numerous changes exist in the details of procedures for accomplishing the desired results. These and other similar modifications may readily suggest themselves to those skilled in the art, and are intended to be encompassed within the spirit of the system and method disclosed herein and the scope of the appended claims.

The invention claimed is:

1. A system comprising:
one or more gas well sites configured to supply gas to a gas plant, each gas well site comprising a gas well connected to a piping, one or more valves installed on the piping, one or more pressure sensors configured to measure a pressure of the gas in the piping, one or more temperature sensors configured to measure a temperature of the gas in the piping, one or more venturi meters configured to measure a differential pressure of the gas in the piping, and one or more programmable logic controllers configured to:
receive measured data from one or more the pressure sensors, the one or more temperature sensors, and the one or more venturi meters;
receive a plurality of dimensions of the one or more venturi meters;
receive a plurality of fluid properties values;
determine a first gas rate based on the measured data from the one or more venturi meters, the plurality of dimensions of the one or more venturi meters, and the plurality of fluid properties values;
determine a condensate rate based on a predetermined condensate to gas ratio (CGR);
determine the gas rate or the condensate rate is outside of a predetermined threshold range; and
identify, based on determining the gas rate or the condensate rate is outside of the predetermined threshold range, one or more problems associated with the one or more venturi meters in the one or more gas well sites.

2. The system of claim 1, wherein the plurality of dimensions of the one or more venturi meters comprises an internal diameter of the venturi pipe and an internal diameter of venturi throat.

3. The system of claim 1, wherein the plurality of fluid properties values comprises at least two of gas density ($\rho g$), condensate density ($\rho c$), condensate mass fraction (CMF), gas conversion factor (GCF), and condensate conversion factor (CCF).

4. The system of claim 1, wherein the plurality of fluid properties values are calculated using a correlation as a function of pressure and temperature, wherein the correlation is generated from an analysis for a specific reservoir at the predetermined condensate to gas ratio (CGR).

5. The system of claim 1, wherein the one or more processors are further configured to:

receive an actual total gas production after separation process of gas and liquid from all gas wells at the gas plant; and determine the overall total gas rate of the one or more venturi meters and total gas rate measured at the gas plant.

6. The system of claim 1, wherein the one or more processors are further configured to:

categorize the measured data as incorrect or wrong if one or both of the values are not matching because of incorrect throat or pipe size or fluid properties correlation.

7. The system of claim 1, wherein the one or more processors are further configured to:

determine the measured data from one or more server sites is outside of the predetermined threshold range; and generate a device calibration or device replacement requirement.

8. The system of claim 1, wherein the one or more processors are further configured to:

categorize a well as a problematic well if the determined gas rate or the determined condensate rate is outside of a predetermined threshold range of a 3-Phase Separator Test values; and generate a rectification job to change the fluid properties correlation with a lower or higher CGR value and/or to do a calibration on the P-T-dP gauges-transmitters.

9. The system of claim 1, wherein the one or more processors are further configured to:

generate a list of identified problematic wells; and
transmit the list to maintenance crew for performing rectification work.

10. The system of claim 1, wherein the one or more processors are further configured to:

evaluate a rate accuracy by reviewing overall performance of the venturi meters from all the gas wells and comparing total gas production between venturi meters and slug-catcher at the gas plant; and generate an alert if rate-discrepancy or error is more than a predetermined percentage.

11. A method for finding and solving problems with a wet gas venturi meter in a gas well, the method comprising:

receiving, by one or more processors, measured data from a plurality of pressure sensors, temperature sensors, and venturi meters;

receiving a plurality of dimensions of one or more venturi meters;

receiving a plurality of fluid properties values;

determining a first gas rate based on the measured data from the plurality of the venturi meters, the plurality of dimensions of the one or more venturi meters, and the plurality of fluid properties values;

determining a condensate rate based on a predetermined condensate to gas ratio (CGR);

determining the gas rate or the condensate rate is outside of a predetermined threshold range; and identifying, based on determining the gas rate or the condensate rate is outside of the predetermined threshold range, one or more problems associated with the one or more venturi meters in one or more gas well sites.

12. The method of claim 11, further comprising:

receiving an actual total gas production after separation process of gas and liquid from all gas wells at gas plant; and determining overall total gas rate of the one or more venturi meters and total gas rate measured at the gas well.

13. The method of claim 11, further comprising:

categorizing the measured data as incorrect or wrong if one or both of the values are not matching because of incorrect throat or pipe size or fluid properties correlation.

14. The method of claim 11, further comprising:

determining the measured data from one or more server sites is outside of the predetermined threshold range; and generating a device calibration or device replacement requirement.

15. The method of claim 11, further comprising:

categorizing a well as a problematic well if the determined gas rate or the determined condensate rate is outside of a predetermined threshold range of a 3-Phase Separator Test values; and generating a rectification job to change the fluid properties correlation with a lower or higher CGR value and/or to do a calibration on the P-T-dP gauges-transmitters.

16. The method of claim 11, further comprising:

generating a list of identified problematic wells; and
transmitting the list to maintenance crew for performing rectification work.

17. The method of claim 11, further comprising:

evaluating a rate accuracy by reviewing overall performance of the one or more venturi meters from all the gas wells and comparing total gas production between venturi meters and slug-catcher at the gas well; and generating an alert if the rate-discrepancy or error is more than a predetermined percentage.

18. A system comprising:

one or more processors, and a non-transitory computer-readable medium in communication with one or more processors and having stored thereon a set of instructions that when executed cause the one or more processors to perform operations including:

receiving measured data from a plurality of pressure sensors, temperature sensors, and venturi meters;

receiving a plurality of dimensions of one or more venturi meters;

receiving a plurality of fluid properties values;

determining a first gas rate based on the measured data from the plurality of the venturi meters, the plurality of dimensions of the one or more venturi meters, and the plurality of fluid properties values;

determining a condensate rate based on a predetermined condensate to gas ratio (CGR);

determining the gas rate or the condensate rate is outside of a predetermined threshold range; and identifying, based on determining that the gas rate or the condensate rate is outside of the predetermined threshold range, one or more problems associated with the one or more venturi meters in one or more gas well sites.

19. The system of claim 18, wherein the plurality of dimensions of the one or more venturi meters comprises an internal diameter of the venturi pipe and an internal diameter of venturi throat.

20. The system of claim 18, wherein the plurality of fluid properties values comprises at least two of gas density ($\rho g$), condensate density ($\rho c$), condensate mass fraction (CMF), gas conversion factor (GCF), and condensate conversion factor (CCF).

* * * * *

UNITED STATES PATENT AND TRADEMARK OFFICE
CERTIFICATE OF CORRECTION

PATENT NO. : 10,890,480 B2
APPLICATION NO. : 15/890444
DATED : January 12, 2021
INVENTOR(S) : Idris et al.

Page 1 of 1

It is certified that error appears in the above-identified patent and that said Letters Patent is hereby corrected as shown below:

In the Claims

In Column 1, Claim 1, Line 33 should read:
-- receive measured data from one or more pressure --

In Column 13, Claim 10, Line 38 should read:
-- comparing total gas production between the venturi meters --

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*